Dec. 8, 1925.  
W. F. HUDSON  
1,564,792  
SPRING SUPPORT FOR MOTOR VEHICLES  
Filed April 30, 1921
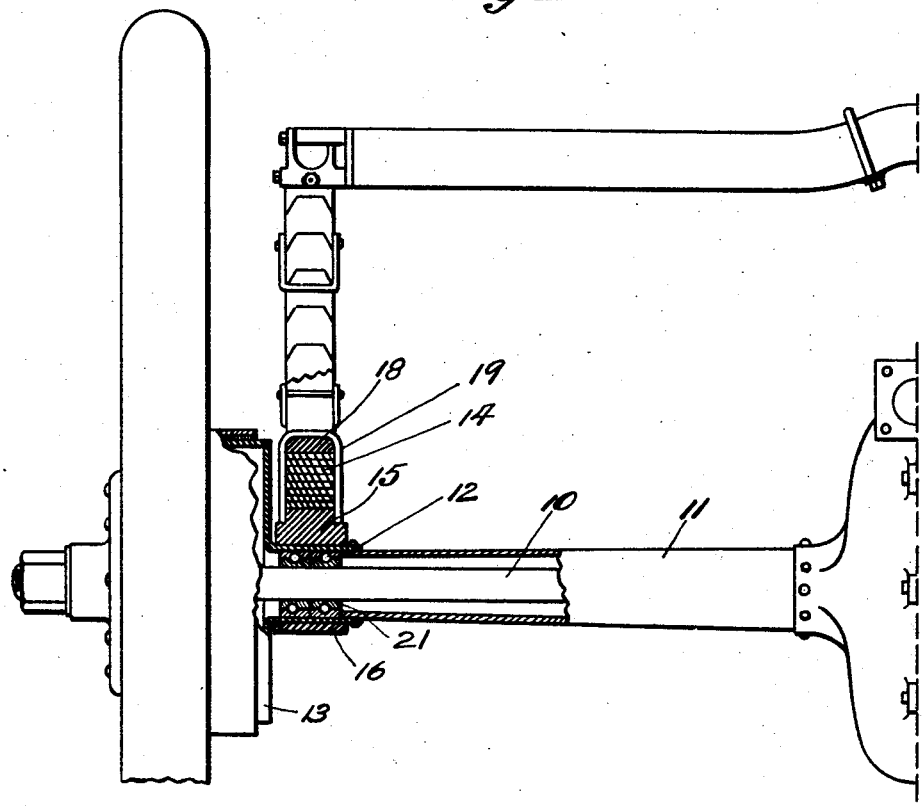
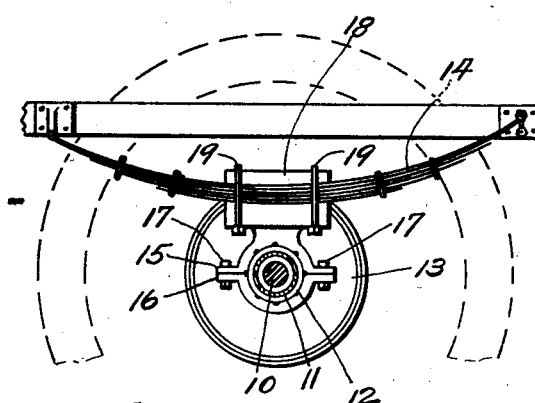
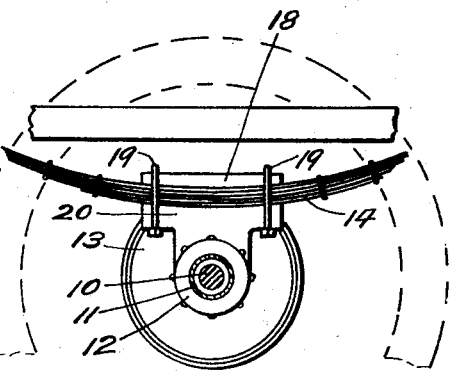
INVENTOR.
William F. Hudson
BY William J. Jackson
ATTORNEY.

Patented Dec. 8, 1925.

1,564,792

UNITED STATES PATENT OFFICE.

WILLIAM F. HUDSON, OF PHILADELPHIA, PENNSYLVANIA.

SPRING SUPPORT FOR MOTOR VEHICLES.

Application filed April 30, 1921. Serial No. 465,767.

*To all whom it may concern:*

Be it known that I, WILLIAM F. HUDSON, a citizen of the United States, residing at the city of Philadelphia, county of Philadelphia, and State of Pennsylvania, have invented a certain new and useful Improved Spring Support for Motor Vehicles, of which the following is a specification.

This invention, generally stated, relates to Ford trucks and has more especial relation to a spring-support therefor.

As is well known a Ford truck is provided with a rear cross-spring which is supported by perch-posts secured to the brake-heads of the rear axle. In equipping a Ford truck with a supplemental platform, as is frequently done in the trade, side-springs are provided for facilitating the efficiency of the truck. In some instances such side-springs are employed in conjunction with the rear cross-spring. In other instances the rear cross-spring is omitted. In some instances the added side-springs are at least partially supported by a perch-post arrangement upon the Ford truck brake-heads. In some instances the side-springs are carried by the rear axle housing.

It is the leading object of the present invention to provide a spring-support for Ford trucks in which the conventional rear cross-spring and complemental perch-posts are dispensed with and in which side-springs are supported entirely upon the sleeves of the Ford brake-heads immediately above the bearings in which the rear axle is mounted.

The invention consists of the improvements hereinafter described and finally claimed.

The nature, characteristic features and scope of the invention will be more fully understood from the following description taken in connection with the accompanying drawings forming part hereof, and in which:

Fig. 1 is a fragmentary view, in rear elevation, of a Ford truck illustrating the application thereto of one form of spring-support, Fig. 2 is a fragmentary view in cross-section, and Fig. 3 is a similar view illustrating a somewhat modified form of construction.

For the purpose of illustrating my invention, I have shown in the accompanying drawings several forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the drawings 10 designates the rear axle of a Ford truck, and 11 the axle housing. Having fixed relation with the axle housing, as by rivets, is the sleeve 12 of a brake-head 13. It is upon the sleeve of the brake-head that I purpose positioning my support for a side-spring 14. As shown in Figs. 1 and 2, I assemble upon the sleeve of the brake-head the parts 15—16 of a saddle to receive said spring 14 the two parts being clamped together by means of bolts 17. The upper part 15 is flat upon its top to afford a seat for the spring. A spring-plate 18 and U-bolts 19 are employed for securing said spring to its saddle. The ends of the side-springs are connected to the chassis frame in any desired manner. It is thus apparent that I employ no perch-post and no rear cross-spring and that a side-spring is supported wholly by the brake-head sleeve. So positioned a side-spring is located immediately above the axle bearings 21.

In Fig. 3, instead of having a separable saddle I form integral with the sleeve of a brake-head a saddle 20 to support a side-spring and employ a spring-plate and U-bolts, as in Figs. 1 and 2, to secure the side-springs to saddle 20.

By the above construction it is possible to form a rear axle which while light is strong enough to answer commercial purposes. Weight is thrown directly over the bearings so that heavy loads may be carried. While I do not claim it is new to make a light construction of axle with the weight thrown directly over the axle bearings, I do claim that to do this by omitting perch-posts and similar constructions and placing supports for side-springs directly upon the brake-head of a truck is novel.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

1. In a construction of the character stated a relatively light rear axle including an automobile wheel and its complemental brake-head, an anti-friction bearing arranged immediately adjacent said brake-head and in which bearing said axle is rotatable, a relatively light housing for said axle, an elongated sleeve extended from said brake-head and secured to said axle housing said sleeve extending well over said anti-friction bearing in concentric relation therewith, a spring support secured to said brake-head sleeve immediately adjacent said brake-head, and a side spring connected to said support so as to be positioned substantially above said bearing and in immediately juxtaposed relation with said wheel.

2. In a construction of the character stated a relatively light rear axle, including an automobile wheel and its complemental brake-head, an anti-friction bearing arranged immediately adjacent said brake-head and in which bearing said axle is rotatable, a relatively light housing for the axle, an elongated sleeve extended from said brake-head and secured to said axle housing said sleeve extending well over said anti-friction bearing in concentric relation therewith, a spring support secured to said brake-head sleeve immediately above said bearing, and a side spring secured to said support so as to be positioned immediately above said bearing and closely adjacent said wheel.

In testimony whereof, I have hereunto signed my name.

WILLIAM F. HUDSON.